(12) United States Patent
Yang et al.

(10) Patent No.: US 11,120,037 B2
(45) Date of Patent: Sep. 14, 2021

(54) TEST DATA INTEGRATION SYSTEM AND METHOD THEREOF

(71) Applicant: Wistron Corporation, New Taipei (TW)

(72) Inventors: Yong Yang, New Taipei (TW); Wanwei Wu, New Taipei (TW); Changqing Xu, New Taipei (TW); Youjun Wang, New Taipei (TW); Liwei Cheng, New Taipei (TW); Genjin Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/593,963

(22) Filed: Oct. 4, 2019

(65) Prior Publication Data
US 2020/0401596 A1   Dec. 24, 2020

(30) Foreign Application Priority Data
Jun. 21, 2019  (CN) .......................... 201910543424.5

(51) Int. Cl.
| G06F 21/44 | (2013.01) |
| G01R 35/00 | (2006.01) |
| G01R 31/28 | (2006.01) |
| G06F 16/25 | (2019.01) |
| G01K 13/00 | (2021.01) |

(52) U.S. Cl.
CPC .......... G06F 16/252 (2019.01); G01K 13/00 (2013.01); G01R 31/2834 (2013.01); G01R 35/00 (2013.01); G06F 21/44 (2013.01)

(58) Field of Classification Search
CPC ....... G06F 16/252; G06F 21/44; G01K 13/00; G01R 31/2834; G01R 35/00
See application file for complete search history.

(56) References Cited

U.S. PATENT DOCUMENTS

| 7,844,412 B2 | 11/2010 | Blancha et al. |
| 7,869,986 B2 | 1/2011 | Blancha et al. |

(Continued)

FOREIGN PATENT DOCUMENTS

| CN | 101512359 | 8/2009 |
| CN | 102597964 | 7/2012 |

(Continued)

OTHER PUBLICATIONS

"Office Action of Taiwan Counterpart Application", dated Oct. 26, 2020, p. 1-p. 6.

(Continued)

*Primary Examiner* — Andrew T Chiusano
(74) *Attorney, Agent, or Firm* — JCIPRNET

(57) ABSTRACT

A test data integration system and a method thereof are provided. The method includes: collecting, by each of a plurality of client devices, a plurality of test information obtained from coupled automatic test equipment when performing a test operation, and transmitting the plurality of test information to a server; receiving, by the server, the plurality of test information, and generating a graphical user interface according to the plurality of test information and displaying an integration analysis result corresponding to the plurality of test information.

18 Claims, 10 Drawing Sheets

(56) References Cited

U.S. PATENT DOCUMENTS

| | | | |
|---|---|---|---|
| 8,065,663 B2 | 11/2011 | Blancha et al. | |
| 8,442,795 B2 | 5/2013 | Blancha et al. | |
| 9,032,384 B2 | 5/2015 | Blancha et al. | |
| 9,164,859 B2 | 10/2015 | Rivera Trevino et al. | |
| 10,451,668 B2 | 10/2019 | Nahum et al. | |
| 2006/0129346 A1* | 6/2006 | Lee | G01R 31/31907 702/122 |
| 2007/0260932 A1* | 11/2007 | Prichard | G06F 11/3476 714/39 |
| 2007/0276682 A1* | 11/2007 | Bolotin | G01R 31/2834 710/302 |
| 2008/0021669 A1 | 1/2008 | Blancha et al. | |
| 2008/0033682 A1 | 2/2008 | Blancha et al. | |
| 2008/0040641 A1 | 2/2008 | Blancha et al. | |
| 2008/0040706 A1 | 2/2008 | Blancha et al. | |
| 2008/0040708 A1 | 2/2008 | Blancha et al. | |
| 2008/0040709 A1 | 2/2008 | Blancha et al. | |
| 2011/0099424 A1 | 4/2011 | Rivera Trevino et al. | |
| 2011/0179158 A1* | 7/2011 | Donnelly | H04L 67/18 709/224 |
| 2016/0003892 A1 | 1/2016 | Blancha et al. | |
| 2017/0059442 A1* | 3/2017 | McClanahan | G01M 3/3272 |
| 2017/0269811 A1* | 9/2017 | Tsujimura | G06F 3/0488 |
| 2018/0313891 A1 | 11/2018 | Nahum et al. | |
| 2020/0041552 A1* | 2/2020 | Lai | G01R 1/07307 |
| 2020/0182927 A1* | 6/2020 | Mo | G01R 31/2834 |
| 2020/0264228 A1* | 8/2020 | Sung | G01R 31/2856 |

FOREIGN PATENT DOCUMENTS

| | | | |
|---|---|---|---|
| CN | 103902429 A | * | 7/2014 |
| CN | 105871418 A | * | 8/2016 |
| CN | 106210013 | | 12/2016 |
| CN | 106294171 | | 1/2017 |
| CN | 109683982 | | 4/2019 |
| TW | 201842447 | | 12/2018 |

OTHER PUBLICATIONS

Office Action of Taiwan Counterpart Application, dated Mar. 11, 2021, pp. 1-7.

* cited by examiner

TEST DATA INTEGRATION SYSTEM AND METHOD THEREOF

CROSS-REFERENCE TO RELATED APPLICATION

This application claims the priority benefit of China application serial no. 201910543424.5, filed on Jun. 21, 2019. The entirety of the above-mentioned patent application is hereby incorporated by reference herein and made a part of this specification.

BACKGROUND OF THE INVENTION

1. Field of the Invention

The present invention relates to a test data integration system and a method thereof.

2. Description of Related Art

Automatic test equipment (ATE) is a device for testing a printed circuit board assembly (PCBA). In order to improve product quality, tests performed by the ATE are often used to improve the production quality of products, thereby preventing the inflow of defective products into the next process in advance, and further improving the efficiency of factories. However, the tests currently performed by the ATE cannot warn in advance and are not intelligently managed. Generally speaking, a problem is usually handled only when it occurs during the test performed by the ATE. This situation often causes problems such as stop of a production line, influence on the production efficiency of a company and cost increase due to maintenance.

In particular, in the existing test technologies, there are the following problems: (1) lack of real-time state tracking of ATE; (2) lack of real-time temperature monitoring of ATE; (3) decentralized test data, which requires manual integration; (4) lack of real-time statistical monitoring of a state of a test fixture and a usage count of a probe.

SUMMARY OF THE INVENTION

An embodiment of the present invention provides a test data integration system and a method thereof, which can monitor automatic test equipment in real time, and integrate test information of each automatic test equipment in real time to generate an integration analysis result, and display the integration analysis result, thereby improving the monitoring efficiency of a production line.

An embodiment of the present invention provides a test data integration system, which includes: a plurality of client devices, each of the plurality of client devices being coupled to automatic test equipment; and a server, coupled to the plurality of client devices. Each of the plurality of client devices collects a plurality of test information obtained from the coupled automatic test equipment when performing a test operation, and transmits the plurality of test information to the server. The server receives the plurality of test information, and generates a graphical user interface according to the plurality of test information to display an integration analysis result corresponding to the plurality of test information.

An embodiment of the present invention provides a test data integration method for a test data integration system. The system includes a plurality of client devices and a server. Each of the plurality of client devices is coupled to automatic test equipment. The server is coupled to the plurality of client devices. The method includes: collecting, by each of a plurality of client devices, a plurality of test information obtained from the coupled automatic test equipment when performing a test operation, and transmitting the plurality of test information to the server; receiving, by the server, the plurality of test information, and generating a graphical user interface according to the plurality of test information to display an integration analysis result corresponding to the plurality of test information.

Based on the foregoing, the present invention provides a test data integration system and a method thereof, which can monitor automatic test equipment in real time, and integrate various test information in real time to generate an integration analysis result, and display the integration analysis result, thereby improving the monitoring efficiency of a production line. In addition, the test data integration system and the method thereof of the present invention can also issue an alerting message or perform a screen locking operation for different situations of the automatic test equipment, thereby enabling processing personnel to more quickly respond to problems generated during the test.

In order to make the aforementioned and other features and advantages of the present invention comprehensible, embodiments accompanied with figures are described in detail below.

DESCRIPTION OF THE EMBODIMENTS

Figure 1:
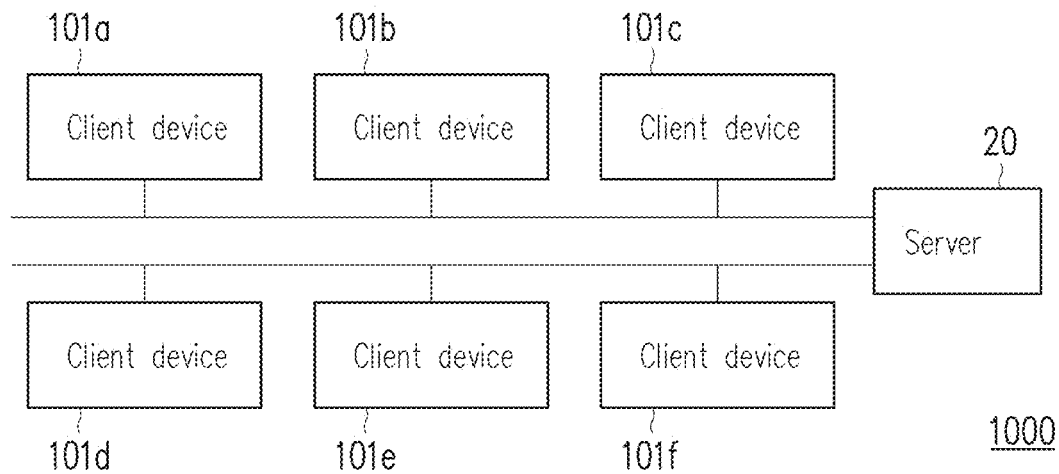
FIG. 1 is a schematic diagram of a test data integration system in accordance with an embodiment of the present invention.

Reference will now be made to exemplary embodiments of the present invention in detail, and examples of the exemplary embodiments will be illustrated in the accompanying drawings. In addition, wherever possible, components/members with the same reference numerals are used to represent the same or similar parts in the drawings and the embodiments.

FIG. 1 is a schematic diagram of a test data integration system in accordance with an embodiment of the present invention.

Referring to FIG. 1, a test data integration system 1000 includes client devices 101a-101f and a server 20. There may be wired or wireless transmission between the client devices 101a-101f and the server 20 via a network. For example, the client devices 101a-101f are not limited to electronic devices such as mobile phones, tablet computers, notebook computers, and desktop computers.

Each of the client devices 101a-101f of the present embodiment includes a processor (not shown), an input circuit (not shown), an output circuit (not shown), a communication circuit (not shown), and a storage circuit (not shown). The foregoing input circuit, output circuit, communication circuit and storage circuit are respectively coupled to the processor.

The processor may be a central processing unit (CPU), or other programmable general-purpose or special-purpose microprocessors, digital signal processors (DSP), programmable controllers, application specific integrated circuits (ASIC), other similar components, or a combination of the aforementioned components.

The input circuit may receive an input from a user via, for example, a keyboard, a mouse, a touch screen or a microphone.

The output circuit may output a message or a signal via, for example, a screen, a speaker, or other output devices.

The communication circuit may be a component that support a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system, a wireless fidelity (Wi-Fi) system, Bluetooth, a wireless gigabit alliance (WiGig) technology or other wired signal transmission.

The storage circuit may be any type of fixed or mobile random access memory (RAM), read-only memory (ROM), flash memory or similar components, or a combination of the aforementioned components.

In the present exemplary embodiment, a plurality of program code segments is stored in the storage circuit of each of the client devices 101a-101f. The client device 101a is taken as an example, where after the program code segment in the storage circuit of the client device 101a is installed, it is executed by the processor of the client device 101a. For example, the storage circuit of the client device 101a includes a plurality of modules, used to perform various operations of the client device 101a in the system 1000 respectively, and each module consists of one or more program code segments. The client device 101b to the client device 101f operate in a manner similar to the client device 101a, and the descriptions thereof are omitted herein. However, the present invention is not limited thereto, and the operation of each of the client devices 101a-101f may be implemented by using other hardware forms.

The server 20 may include a processor (not shown), a communication circuit (not shown) and a storage circuit (not shown). The foregoing communication circuit and storage circuit are respectively coupled to the processor.

The processor, the communication circuit and the storage circuit of the server 20 may be components respectively similar to the processor, the communication circuit and the storage circuit of the client devices 101a-101f, and the descriptions thereof are omitted herein. A plurality of program code segments or a plurality of modules is stored in the storage circuit of the server 20. After the program code segments or the plurality of modules in the storage circuit are installed, various operations of the server 20 in the system 1000 may be performed by the processor of the server 20.

In the present embodiment, each client device in FIG. 1 may be coupled to automatic test equipment. In more detail, FIG. 2 is a schematic diagram of coupling a client device to automatic test equipment in accordance with an embodiment of the present invention.

Figure 2:
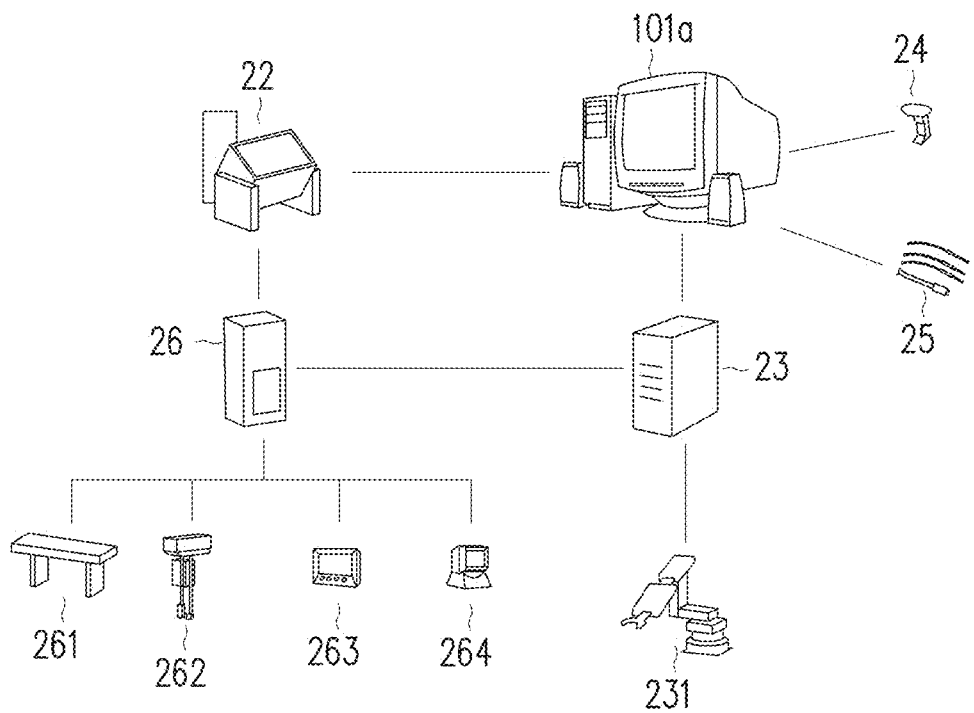
FIG. 2 is a schematic diagram of coupling a client device to automatic test equipment in accordance with an embodiment of the present invention.

Referring to FIG. 2, the client device 101a is taken as an example, where the client device 101a is coupled to automatic test equipment 22, an industrial switch 23, a brush gun 24, and a temperature sensor 25. The automatic test equipment 22 and the industrial switch 23 are coupled to a programmable logic controller (PLC) 26. The industrial switch 23 is coupled to a mechanical arm 231. The programmable logic controller 26 is coupled to a guide rail 261, a labor saving device 262, a human-computer interaction interface 263, and a scanning device 264. It should be noted that since the functions of test devices such as the automatic test equipment 22, the industrial switch 23, the mechanical arm 231, the brush gun 24, the temperature sensor 25, the programmable logic controller 26, the guide rail 261, the labor saving device 262, the human-computer interaction interface 263, and the scanning device 264 can be well known to those skilled in the art, the descriptions thereof are omitted herein. It should be noted that the temperature sensor 25 is used to sense a temperature of the automatic test equipment 22. Although FIG. 2 takes the client device 101a as an example, the same configuration of FIG. 2 may be applied to the client devices 101b-101f.

In the present embodiment, each client device in FIG. 1 is provided with sub-control software, and the server 20 is provided with main control software. In detail, FIG. 3 is a schematic diagram of main control software and sub-control software in accordance with an embodiment of the present invention.

Figure 3:
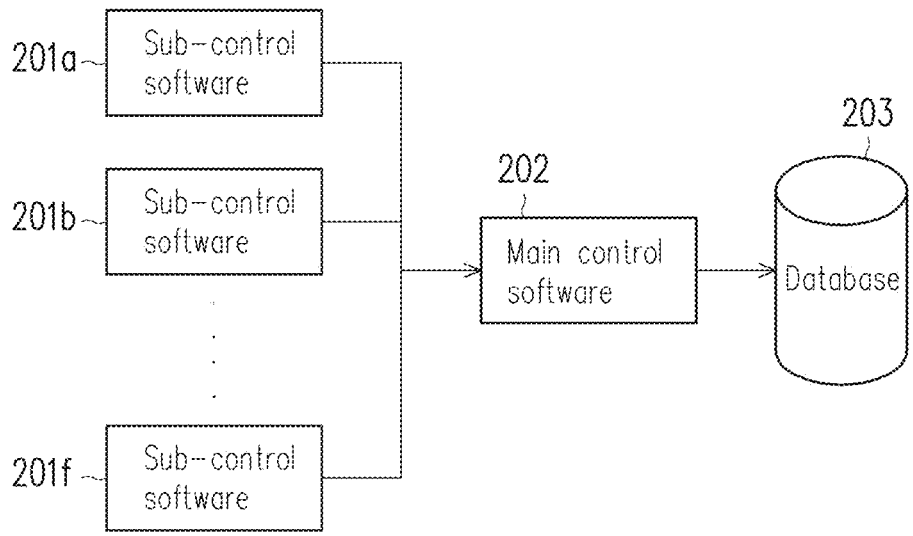
FIG. 3 is a schematic diagram of main control software and sub-control software in accordance with an embodiment of the present invention.

Referring to FIG. 3, sub-control software 201a-201f may be respectively provided in the client devices 101a-101f. Main control software 202 may be provided in the server 20. In the present embodiment, the server 20 is also coupled to a database 203. In another embodiment, the database 203 may also be configured in the server 20.

Figure 4:
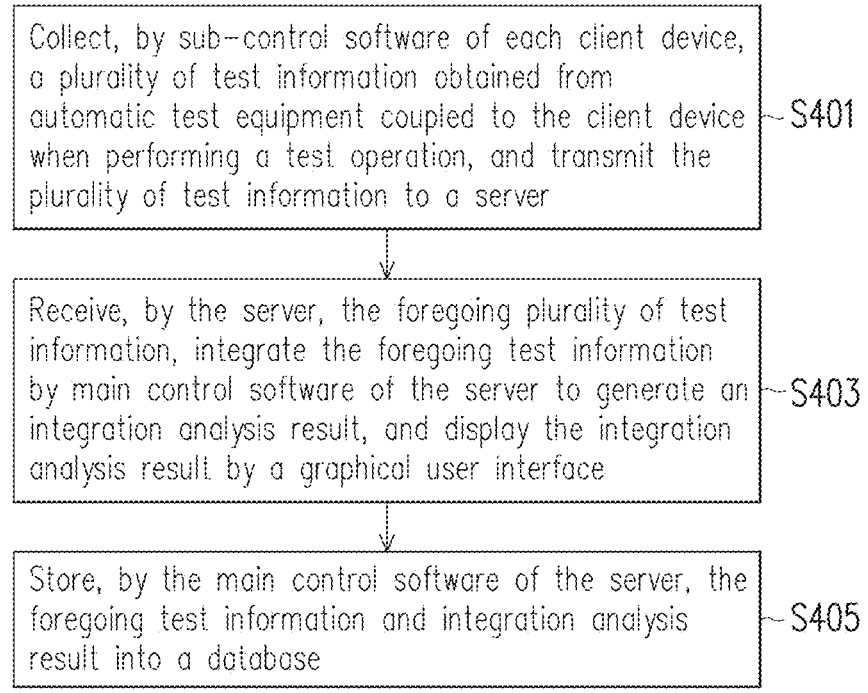
FIG. 4 is a schematic diagram of a test data integration method in accordance with an embodiment of the present invention.

FIG. 4 is a schematic diagram of a test data integration method in accordance with an embodiment of the present invention.

Referring to FIG. 1, FIG. 3 and FIG. 4 simultaneously, in the present embodiment, the sub-control software of each client device in FIG. 1 collects a plurality of test information obtained from coupled automatic test equipment or other coupled test devices when performing a test operation, and transmits the plurality of test information to the server 20 (step S401). It should be noted that the present invention is not intended to limit the content of the test information. In an embodiment, the test information may be a temperature of automatic test equipment, a probe operation record, or related information that can be obtained by a client device when performing an operation, and the descriptions thereof are omitted herein.

Then, the server 20 receives the plurality of test information in the foregoing step S401, and integrates the foregoing test information by the main control software 202 of the server 20 to generate an integration analysis result, and display the integration analysis result by a graphical user interface (step S403). In addition, in the present embodiment, the server 20 is also coupled to the database 203, and the main control software 202 of the server 20 stores the foregoing test information and integration analysis result into the database 203 (step S405).

It should be noted that in the present embodiment, the main control software 202 of the server 20 may display the integration analysis result by using the graphical user interface, and the sub-control software of each client device may also display, by using the graphical user interface, detailed test information collected by automatic test equipment or other coupled test devices when performing a test operation.

Figure 5:
FIG. 5 is a schematic diagram of displaying detailed test information by sub-control software through a user interface in accordance with an embodiment of the present invention.

In detail, FIG. 5 is a schematic diagram of displaying detailed test information by sub-control software through a user interface in accordance with an embodiment of the present invention.

Referring to FIG. 5, the following description takes the client device 101c as an example. However, it should be noted that the following applications may also be applied to other client devices in the test data integration system 1000. When an automatic test equipment connected to the client device 101c performs a test operation, the client device 101c may collect and obtain test information of the automatic test equipment when performing the test operation. Then, the sub-control software of the client device 101c may display a plurality of detailed test information of the automatic test equipment coupled to the client device 101c by using a user interface of the client device 101c according to the collected test information. A user interface 500 of FIG. 5 is taken as an example. In a production line, test operations performed in different time periods may be divided into "day shift" and "night shift". For example, a test operation performed from 8:00 am to 8:00 pm may be referred to as "day shift", and a test operation performed from 8:00 pm to 8:00 am may be referred to as "night shift". The user interface 500 may include blocks 50-54. Fields 50a-50d in the block 50 are respectively used to display a total number of test passes, a total number of first pass yields, a total number of retry passes, and a total number of bad test results in the test operations performed by the day shift and the night shift. Fields 51a-51d in the block 51 are respectively used to display a number of test passes, a number of first pass yields, a number of retry passes, and a number of bad test results in the test operation performed by the day shift. Fields 52a-52d in the block 52 are respectively used to display a number of test passes, a number of first pass yields, a number of retry passes, and a number of bad test results in the test operation performed by the night shift.

In addition, the block 53 in the user interface 500 includes fields 53a-53d. The fields 53a-53d are respectively used to display a test item name, a state of a signal line, a test category, and a test count. In addition, the block 54 is used to display problems occurring during a test.

Figure 6A:
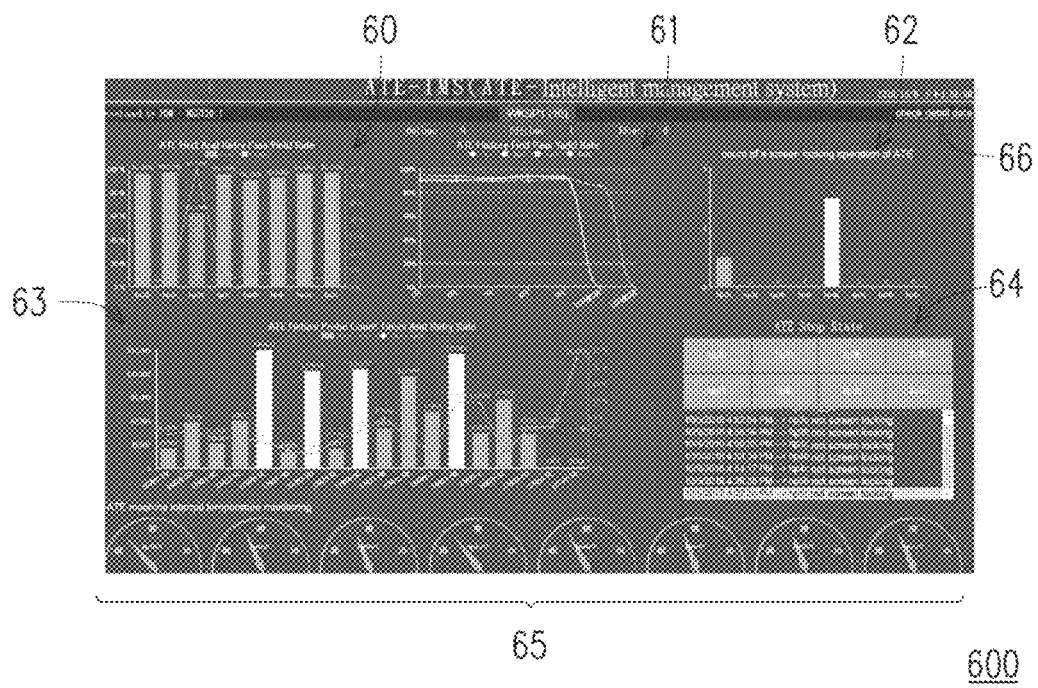
FIG. 6A and FIG. 6B are schematic diagrams of displaying an integration analysis result by main control software through a graphical user interface in accordance with an embodiment of the present invention.
Figure 6B:
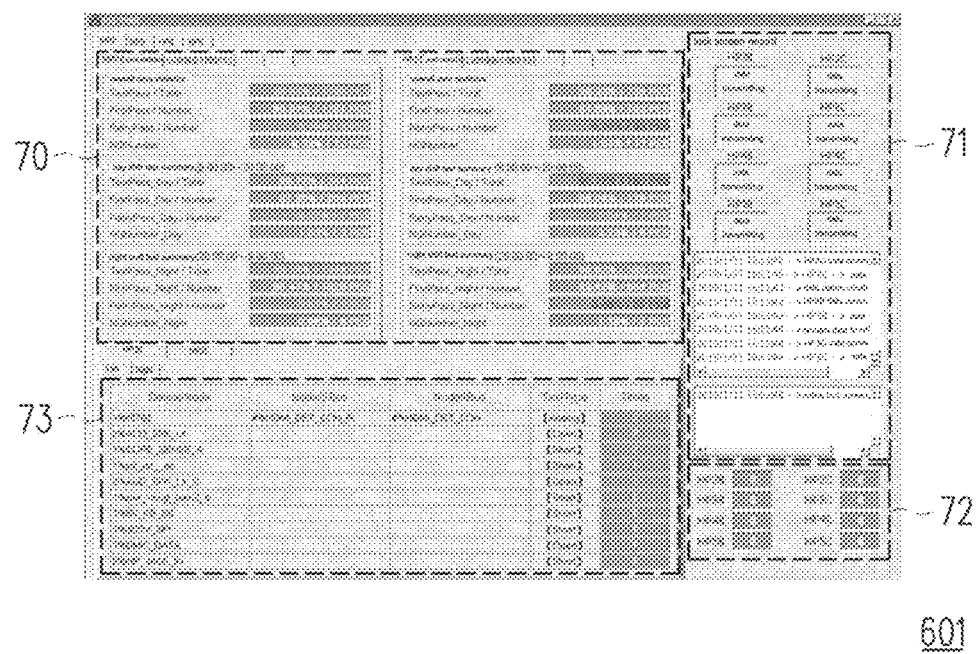

FIG. 6A and FIG. 6B are schematic diagrams of displaying an integration analysis result by main control software through a graphical user interface in accordance with an embodiment of the present invention.

Referring to FIG. 6A, the graphical user interface 600 may be used to display graphs 60-65. The graph 60 is used to represent real-time test data (e.g., first pass yield) of each of the client devices 101a-101f. The graph 61 is used to represent historical test data of each of the client devices 101a-101f. The graph 62 is used to represent a screen locking record of each of the client devices 101a-101f. The screen locking technology will be described in detail hereinafter. The graph 63 is used to represent a probe operation situation of the automatic test equipment coupled to each of the client devices 101a-101f. The graph 64 is used to represent a connection state between each of the client devices 101a-101f and the server 20. In the present embodiment, when the connection state of a client device is normal, a pattern corresponding to the client device is displayed in green. When the connection state of a client device is abnormal, a pattern corresponding to the client device is displayed in red. The graph 65 is used to represent a real-time temperature of each of the client devices 101a-101f.

In addition, a user may, for example, click on an option 66 in a graphical user interface 600 to display a graphical user interface 601 as in FIG. 6B.

The graphical user interface 601 includes areas 70-73. The area 70 is used to display detailed test information of at least one of the client devices 101a-101f, and may be switched to display detailed test information of other client devices. The content of the detailed test information here may be a number of test passes, a number of first pass yields, a number of retry passes, and a number of bad test results. The area 71 is used to display a connection state between the server 20 and each of the client devices 101a-101f. In the present embodiment, when the connection state of a client device is normal, a pattern corresponding to the client device is displayed in green. When the connection state of a client device is abnormal, a pattern corresponding to the client device is displayed in red. The area 72 is used to display a count of a screen locking operation performed by each of the client devices 101a-101f. The area 73 is used to display the ranking of statistical results of a plurality of test items (for example, the top ten test items based on statistical data).

Figure 7A:
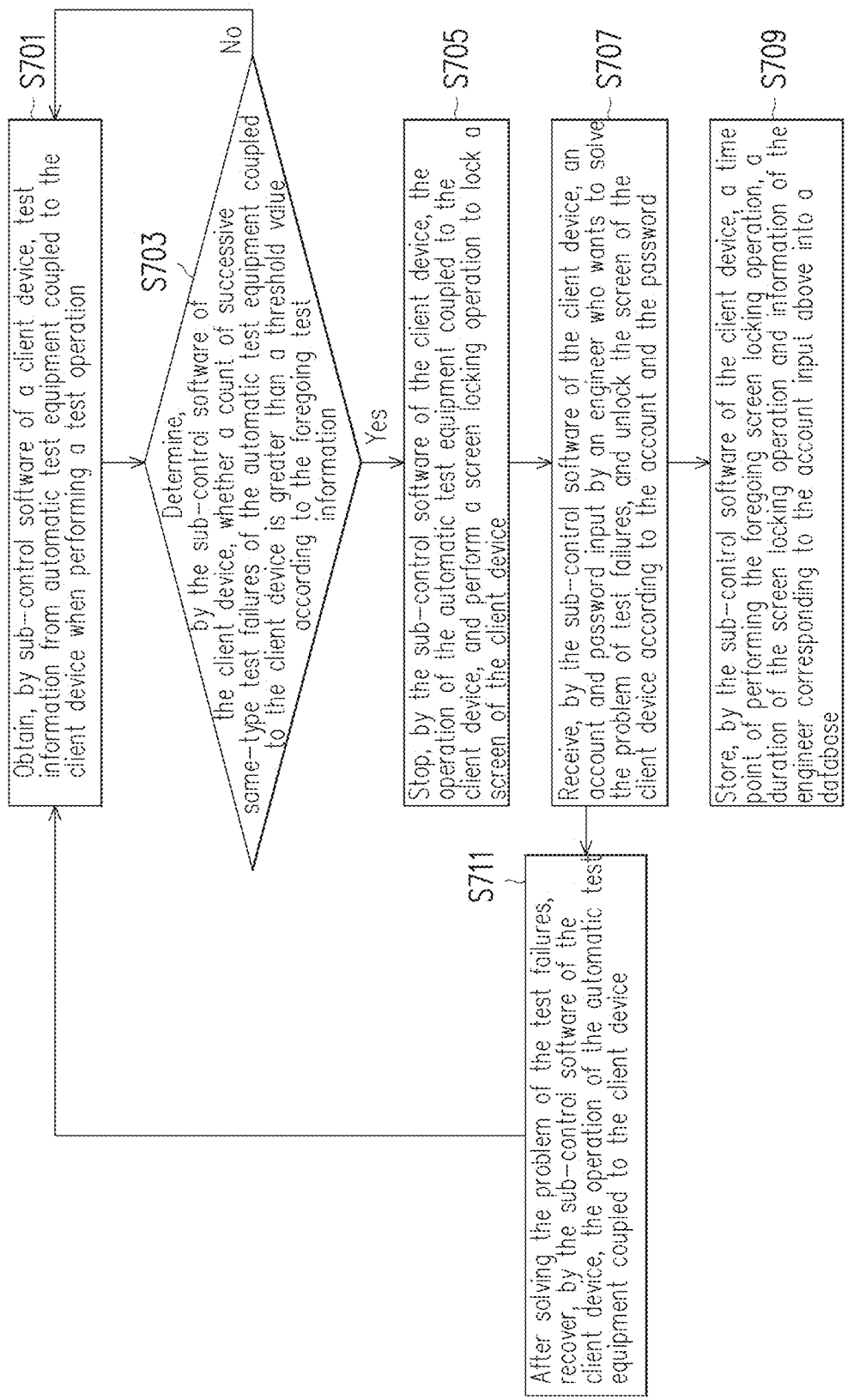
FIG. 7A is a flowchart of performing a screen locking operation in accordance with an embodiment of the present invention.

FIG. 7A is a flowchart of performing a screen locking operation in accordance with an embodiment of the present invention.

Referring to FIG. 7A, the following description takes the client device 101a as an example. However, it should be noted that the following applications may also be applied to other client devices in the test data integration system 1000. In the present embodiment, the sub-control software of the client device 101a may first obtain test information from automatic test equipment coupled to the client device 101a or other coupled test devices when performing a test operation (step S701). Then, the sub-control software of the client device 101a may determine, according to the foregoing test information, whether a count of successive same-type test failures of the automatic test equipment coupled to the client device 101a is greater than a threshold value (also referred to as a first threshold value) (step S703). In the present embodiment, the first threshold value may be "2". In another embodiment, in step S703, determination may be performed by the main control software of the server 20 according to test information, and a determination result is transmitted to the client device 101a.

When it is determined that a count of successive same-type test failures of the automatic test equipment coupled to the client device 101a is not greater than the first threshold value, the process returns to step S701. Responding to that the test information of the client device 101a has a same-type test failure record and a count of successive occurrences of the same-type test failure record is greater than the first threshold value (that is, when it is determined that a count of successive same-type test failures of the automatic test equipment coupled to the client device 101*a* is greater than the first threshold value), the sub-control software of the client device 101*a* stops the operation of the automatic test equipment coupled to the client device 101*a*, and performs a screen locking operation to lock a screen of the client device 101*a* (step S705).

After step S705 is performed, the sub-control software of the client device 101*a* may receive an account and a password. For example, an engineer who wants to solve the problem of test failures inputs a specific account and password to the sub-control software, and unlocks the screen of the client device 101*a* according to the account and the password (step S707). After unlocking the screen of the client device 101*a*, the engineer may begin to deal with the problem of the test failures.

After step S707 is performed, the sub-control software of the client device 101*a* stores a time point of performing the foregoing screen locking operation, a duration of the screen locking operation and information of the engineer corresponding to the account input above into the database 203 (step S709). In another embodiment, the sub-control software may further store maintenance status information into the data base 203, and the maintenance status information is, for example, a related instruction, a related repair record and a related inspection record that are record by the client device 101*a* during the maintenance of the engineer. In addition, after the engineer solves the problem of the test failures, the sub-control software of the client device 101*a* recovers the operation of the automatic test equipment coupled to the client device 101*a* in response to elimination of the problem of the test failures (step S711).

Figure 7B:
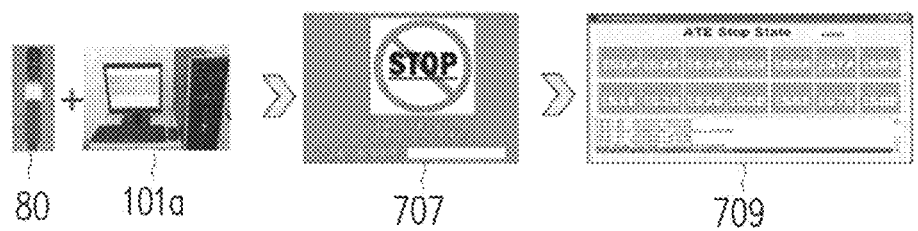
FIG. 7B is a flowchart of outputting, by an alerting device, an alerting message in accordance with an embodiment of the present invention.

In particular, FIG. 7B is a flowchart of outputting, by an alerting device, an alerting message in accordance with an embodiment of the present invention.

Referring to FIG. 7B, in the present embodiment, the test data integration system 1000 is further provided with a plurality of alerting devices, respectively coupled to the client devices 101*a*-101*f*. The foregoing alerting device is, for example, an alerting light, but the present invention is not limited thereto. An alerting device 80 (also referred to as a first alerting device) coupled to the client device 101*a* is taken as an example. When the sub-control software of the client device 101*a* performs the screen locking operation in the foregoing step S705, the alerting device coupled to the client device 101*a* also outputs an alerting message (for example, turning on the alerting light). When the screen of the client device 101*a* is in a locked state, the screen of the client device 101*a* may display a picture 707. In addition, since the automatic test equipment connected to the client device 101*a* is also connected to a human-computer interaction interface through the client device 101*a* or the server 20, the human-computer interaction interface may also display a picture 709 to indicate that the automatic test equipment connected to the client device 101*a* is in a stop state.

In particular, in an embodiment, the sub-control software (or the main control software of the server) in the client device may also be used to determine whether the test information obtained by the client device meets a condition. When the condition is met, the sub-control software may send a warning message. For example, the client device 101*d* is employed. Responding to that the test information corresponding to the client device 101*d* meets a condition (i.e., when the sub-control software of the client device 101*d* determines that the test information obtained by the client device 101*d* meets a condition), the sub-control software of the client device 101*d* or the main control software of the server 20 sends a warning message to inform relevant personnel or units through a communication software. It should be noted that although the client device 101*d* is described here, similar operations can be applied to other client devices in FIG. 1.

The flow of sending a warning message will be described below in two embodiments.

Figure 8:
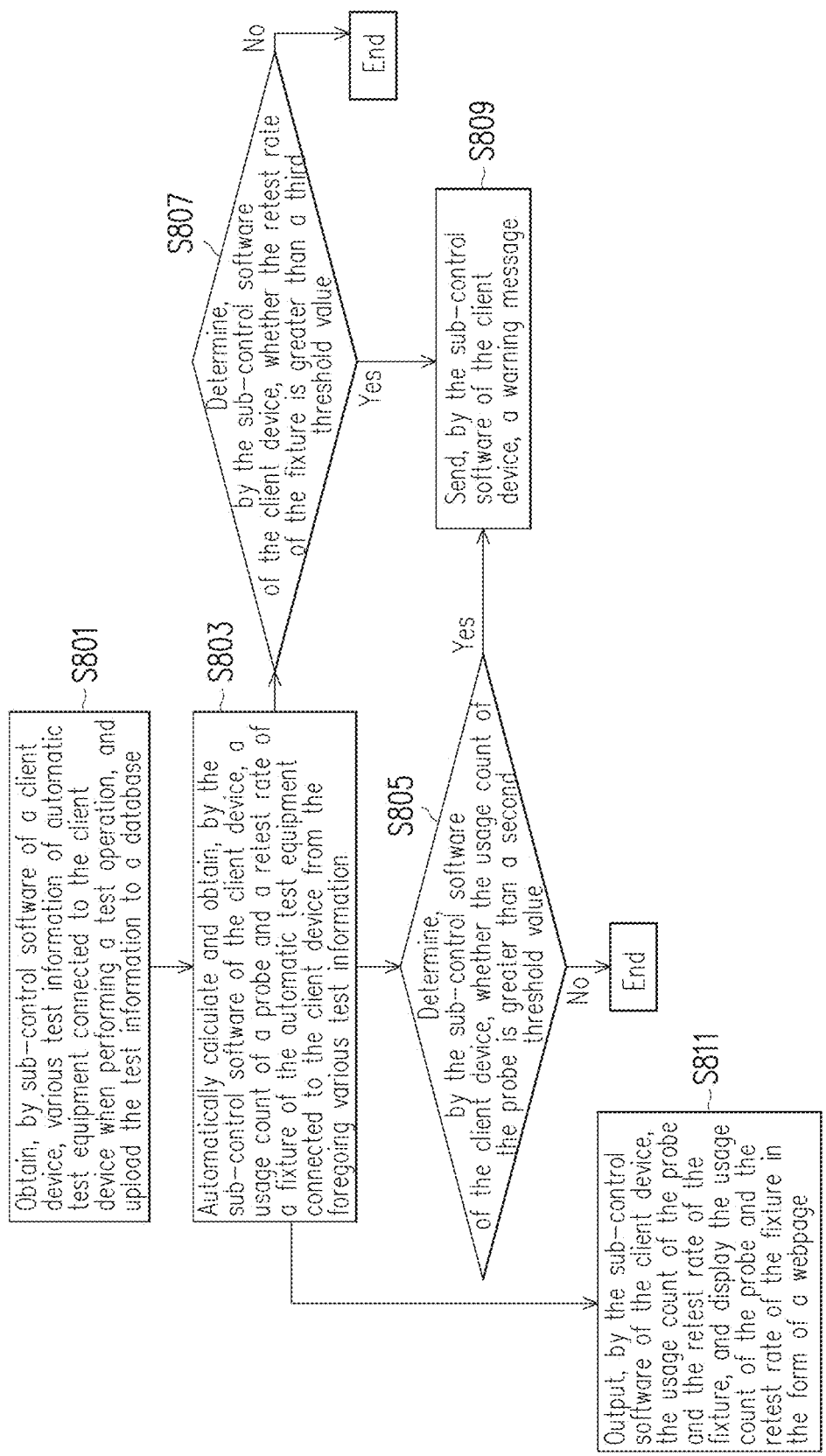
FIG. 8 is a flowchart of sending a warning message in accordance with an embodiment of the present invention.

FIG. 8 is a flowchart of sending a warning message in accordance with an embodiment of the present invention.

Referring to FIG. 8, in the embodiment of FIG. 8, the foregoing test information may include a usage count of a probe or a retest rate of a fixture of the automatic test equipment coupled to the client device 101*d* or other coupled test devices. In general, when the fixture is pressed once in each test operation, it means that the usage count of the probe is increased once. In step S801, the sub-control software of the client device 101*d* may obtain various test information of the automatic test equipment connected to the client device 101*d* or other connected test devices when performing the test operation, and upload the test information to the database 203. Then, in step S803, the sub-control software of the client device 101*d* may automatically calculate and obtain, from the foregoing various test information, the usage count of the probe and the retest rate of the fixture of the automatic test equipment connected to the client device 101*d* or other connected test devices. Then, in step S805, the sub-control software of the client device 101*d* may determine whether the usage count of the probe is greater than a second threshold value. The second threshold value is, for example, 150,000, but it is not limited thereto.

When the sub-control software of the client device 101*d* determines that the usage count of the probe is greater than the second threshold value, in step S809, the sub-control software of the client device 101*d* may send a warning message to inform related personnel or units. When the sub-control software of the client device 101*d* determines that the usage count of the probe is not greater than the second threshold value, the flow of FIG. 8 is ended.

In addition, after step S803 is performed, in step S807, the sub-control software of the client device 101*d* may determine whether the retest rate of the fixture or other connected test devices is greater than a third threshold value. The third threshold value is, for example, 7%, but it is not limited thereto.

When the sub-control software of the client device 101*d* determines that the retest rate of the fixture or other connected test devices is greater than the third threshold value, in step S809, the sub-control software of the client device 101*d* may send a warning message to inform related personnel or units. For example, the sub-control software sends a warning message by WeChat or other communication software to inform related personnel or units. When the sub-control software of the client device 101*d* determines that the retest rate of the fixture or other connected test devices is not greater than the third threshold value, the flow of FIG. 8 is ended.

In addition, after step S803 is performed, in step S811, the sub-control software of the client device 101*d* may also transmit the usage count of the probe and the retest rate of the fixture to the server 20 or the database 203, and display the usage count of the probe and the retest rate of the fixture. In another embodiment, steps S803-S811 may also be performed by the main control software of the server 20.

Figure 9:
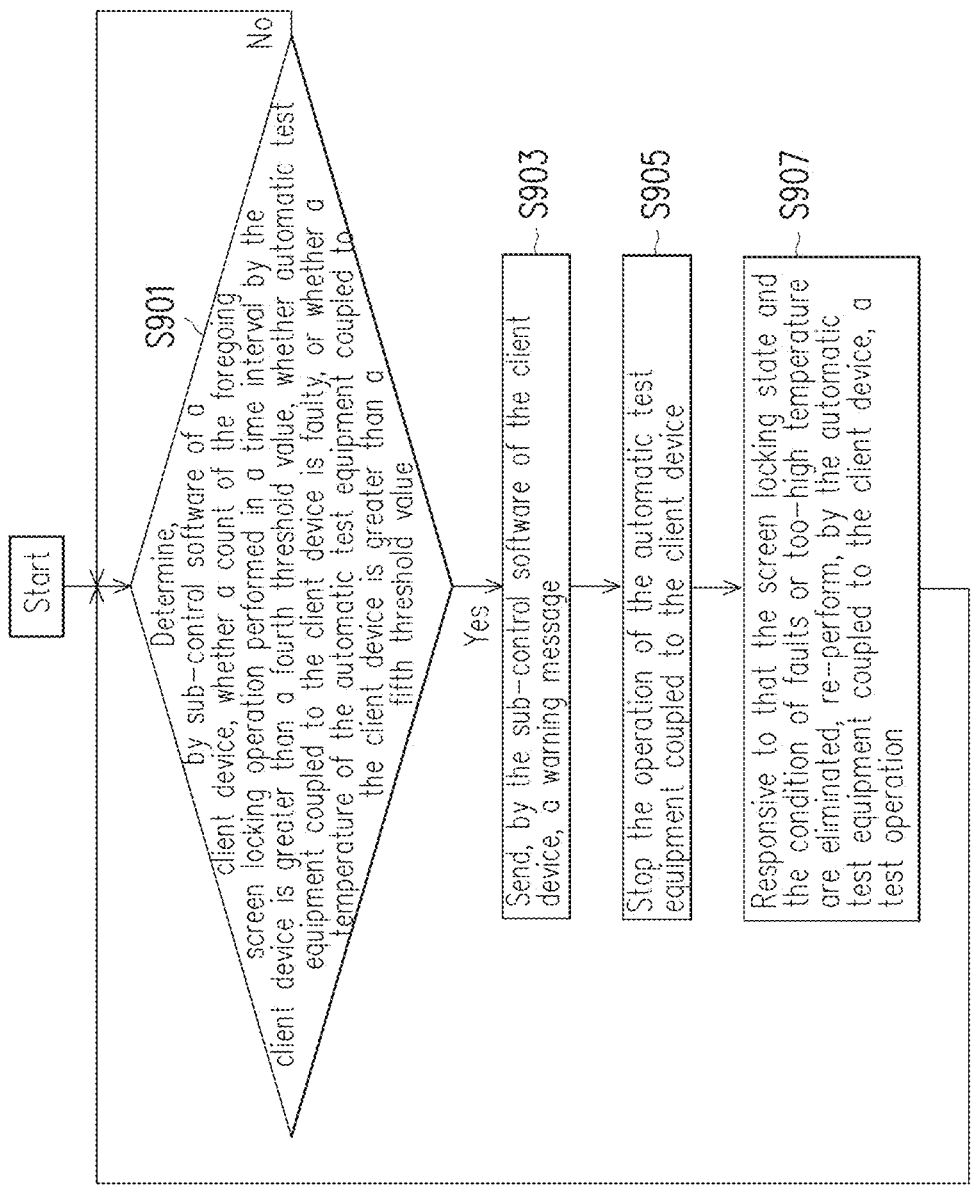
FIG. 9 is a flowchart of sending a warning message in accordance with another embodiment of the present invention.

FIG. 9 is a flowchart of sending a warning message in accordance with another embodiment of the present invention.

Referring to FIG. 9, in step S901, the sub-control software of the client device 101*d* determines whether a count of the foregoing screen locking operation performed in a time interval (e.g., ten minutes) by the client device 101*d* is greater than a fourth threshold value (e.g., two), whether the automatic test equipment coupled to the client device 101*d* is faulty, or whether a temperature of the automatic test equipment coupled to the client device 101*d* is greater than a fifth threshold value (e.g., 45° C.).

When the sub-control software of the client device 101*d* determines that the count of the foregoing screen locking operation performed in a time interval by the client device 101*d* is greater than the fourth threshold value, the automatic test equipment coupled to the client device 101*d* is faulty, or the temperature of the automatic test equipment coupled to the client device 101*d* is greater than the fifth threshold value (e.g., 45), in step S903, the sub-control software of the client device 101*d* sends a warning message to inform related personnel or units. Then, in step S905, the operation of the automatic test equipment coupled to the client device 101*d* is stopped. Responding to the elimination of the screen locking state and the condition of faults or too-high temperature, in step S907, the automatic test equipment coupled to the client device 101*d* may re-perform the test operation and perform step S901. In another embodiment, steps S901-S907 may also be performed by the main control software 202 of the server 20.

Figure 10A:
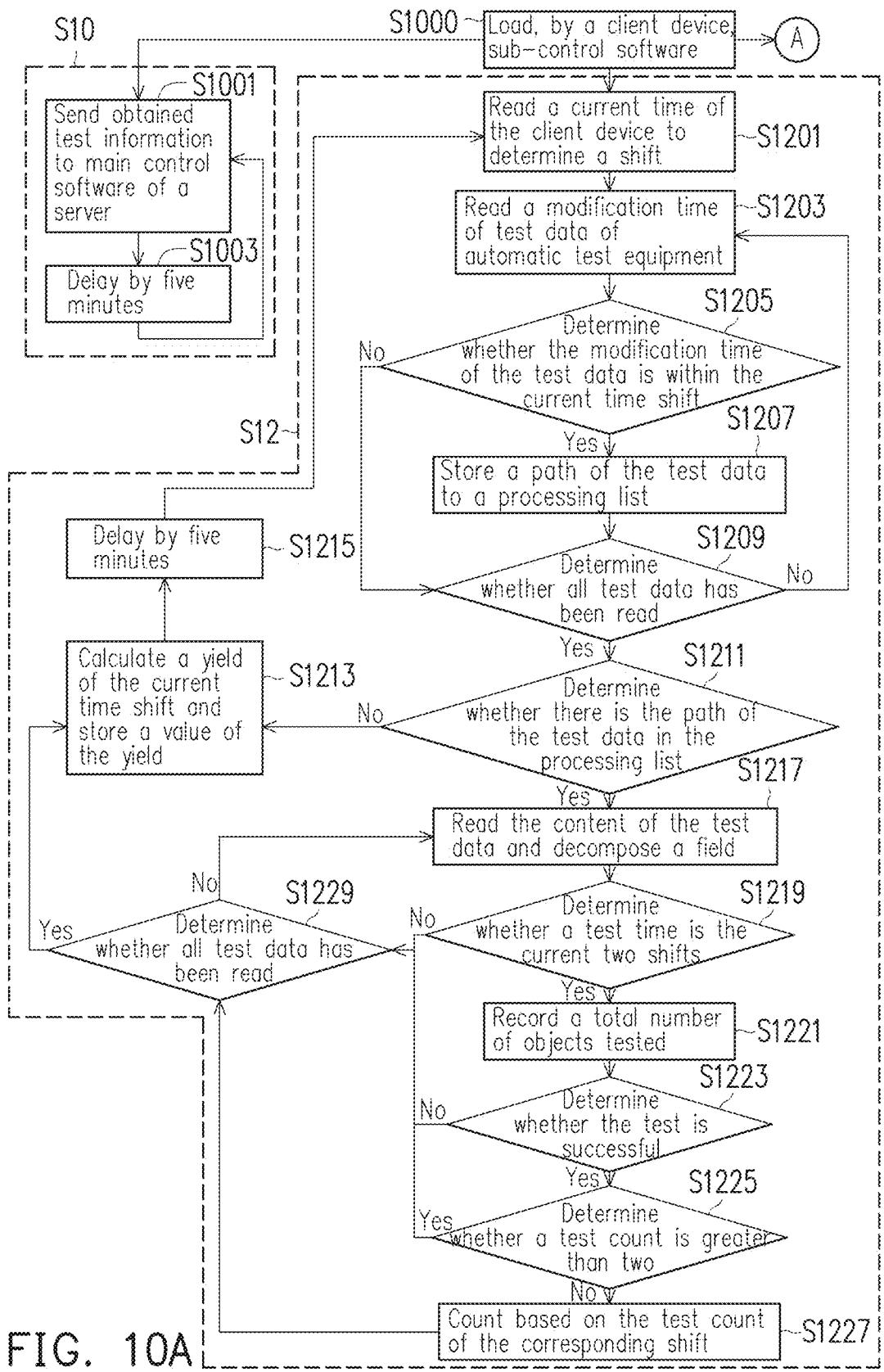
FIG. 10A and FIG. 10B are flowcharts of operation of sub-control software in accordance with an embodiment of the present invention.
Figure 10B:
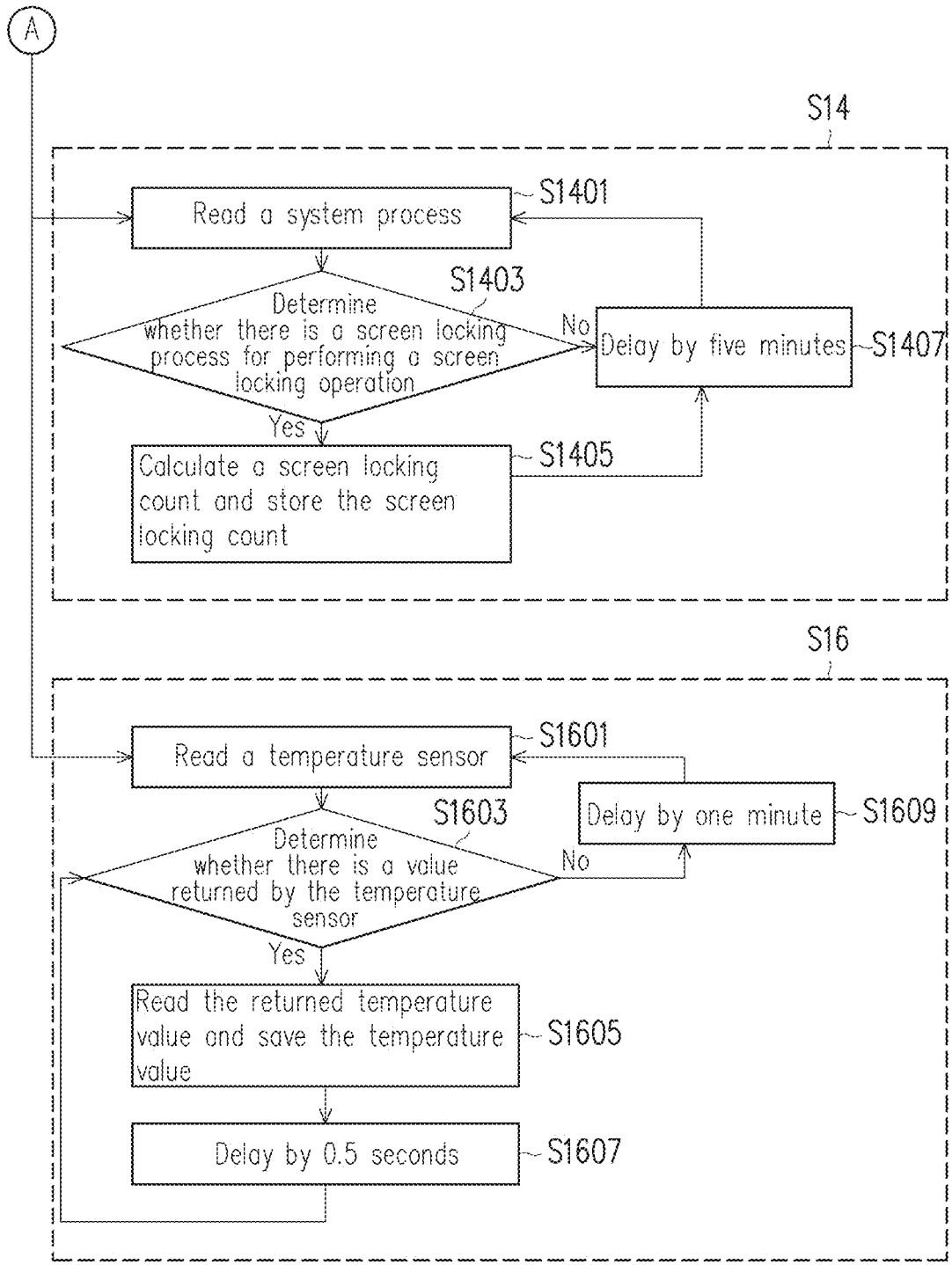

FIG. 10A and FIG. 10B are flowcharts of operation of sub-control software in accordance with an embodiment of the present invention.

Referring to FIG. 10A and FIG. 10B simultaneously, in step S1000, a client device may load sub-control software and perform a process S10, a process S12, a process S14, and a process S16.

For the process S10, the sub-control software sends the obtained test information to the main control software of the server 20 in step S1001. Then, in step S1003, the main control software may be delayed by five minutes, and step S1001 is performed again.

For the process S12, in step S1201, the sub-control software reads a current time of the client device to determine a shift (e.g., day shift or night shift). In step S1203, the sub-control software reads a modification time of test data of the automatic test equipment. In step S1205, the sub-control software determines whether the modification time of the test data is within the current time shift. If the modification time of the test data is within the current time shift, the sub-control software stores a path of the test data to a processing list in step S1207, and step S1209 is performed. If the modification time of the test data is not within the current time shift, step S1209 is directly performed.

In step S1209, the sub-control software determines whether all test data has been read. If no, the process returns to step S1203. If yes, the sub-control software determines whether there is a path of the test data in the processing list in step S1211. If there is no path of the test data in the processing list, the sub-control software calculates a yield of the current time shift and stores a value of the yield in step S1213. The sub-control software is delayed by five minutes in step S1215, and step S1201 is re-performed.

Assuming that the sub-control software determines that there is a path of test data in a processing list in step S1211, the sub-control software reads, in step S1217, the content of the test data and decomposes a field, for example, decomposes a time field, a test success flag (e.g., field "OK"), a test failure flag (e.g., field "NG" or "FAIL") or the like in the test data. Next, in step S1219, the sub-control software determines whether the test time is the current two shifts. If the test time is the current two shifts, the sub-control software records a total number of objects tested by the corresponding shift in step S1221, and the sub-control software determines whether the test is successful in step S1223. If the test is successful, the sub-control software determines whether a test count is greater than two in step S1225. If the test count is not more than two, the sub-control software counts based on the test count of the corresponding shift in step S1227. And step S1229 is performed.

It should be noted that, in step S1219, when the sub-control software determines that the test time is not the current two shifts, step S1229 is also directly performed. In step S1225, when the sub-control software determines that the test count is greater than two, step S1229 is also directly performed. In addition, in step S1223, when the sub-control software determines that the test is not successful, step S1229 is also directly performed. It should be noted that steps S1219-S1227 correspondingly record information such as the total number of objects tested, the test count and the shifts to the database 203. In addition, the sub-control software of the subsequent client device or the main control software of the server may use data in the database 203 to calculate information such as a test pass rate, a retest rate or a failure rate. In addition, the data of the test count may also be used to determine whether the same type of test failures occurs successively, so as to determine whether to perform a screen locking operation.

In step S1229, the sub-control software determines whether all test data has been read. If no, step S1217 is repeated. If yes, step S1213 and step S1215 are performed.

For the process S14, the sub-control software reads a system process in step S1401. In step S1403, the sub-control software determines whether there is a screen locking process for performing the screen locking operation. If yes, the sub-control software calculates a screen locking count and stores the screen locking count in step S1405. Then, step S1401 is re-performed after the sub-control software is delayed by five minutes in step S1407. In addition, if the sub-control software determines that there is no screen locking process for performing the screen locking operation, step S1407 is directly performed.

For the process S16, the sub-control software reads a temperature sensor in step S1601. In step S1603, the sub-control software determines whether there is a value returned by the temperature sensor. If yes, the returned temperature value is read and saved in step S1605. If no, step S1601 is performed again after the sub-control software is delayed by one minute in step S1609. In addition, after step S1605 is performed, step S1603 is performed again after the sub-control software is delayed by 0.5 seconds in step S1607.

Based on the foregoing, the test data integration system and the method thereof of the present invention can monitor automatic test equipment in real time, and integrate test information of automatic test equipment in real time to generate an integration analysis result, and display the integration analysis result, thereby improving the monitoring efficiency of a production line. In addition, the test data integration system and the method thereof of the present invention can also issue an alerting message or perform a screen locking operation for different situations of the automatic test equipment, thereby enabling processing personnel to more quickly respond to problems generated by the automatic test equipment. In particular, the sub-control software of the client device may provide a display interface, and the main control software of the server may also provide a display interface, so that manager and production line maintainer billboards can be connected to the client device or the server through an office computer at any time to obtain the content of the corresponding interface. In addition, the present invention can also provide different interfaces for different user identities. For example, a management billboard may be provided to a supervisor and an engineer; a maintenance billboard and a sub-control interface may be provided to an engineer on a production line; and an interface of a main control server may be provided to a development engineer.

Although the present invention has been disclosed with the foregoing embodiments, it is not intended to limit the present invention, and it is possible for any person of ordinary skill in the art to make some modifications and refinements without departing from the spirit and scope of the present invention. Therefore, the scope of protection of the present invention should be defined by the scope of the appended claims.

What is claimed is:

1. A test data integration system, comprising:
   a plurality of client devices, each of the plurality of client devices being coupled to automatic test equipment; and
   a server, coupled to the plurality of client devices, wherein
   each of the plurality of client devices collects a plurality of test information obtained from the coupled automatic test equipment when performing a test operation, and transmits the plurality of test information to the server; and
   the server receives the plurality of test information, and generates a graphical user interface according to the plurality of test information and displays an integration analysis result corresponding to the plurality of test information,
   wherein responding to that at least one of the plurality of test information corresponding to a first client device in the plurality of client devices has a same-type test failure record and a count of successive occurrences of the same-type test failure record is greater than a first threshold value, the first client device stops the operation of the automatic test equipment coupled to the first client device, and performs a screen locking operation to lock a screen of the first client device,
   after performing the screen locking operation to lock the screen of the first client device, the first client device receives an account and a password, and unlocks the screen of the first client device according to the account and the password, and
   the first client device stores a time point of performing the screen locking operation, a duration of the screen locking operation and personnel information corresponding to the account.

2. The test data integration system according to claim 1, wherein
   the first client device stores the time point of performing the screen locking operation, the duration of the screen locking operation and the personnel information corresponding to the account into a database.

3. The test data integration system according to claim 1, further comprising:
   a plurality of alerting devices, the plurality of alerting devices being coupled to the plurality of client devices respectively, wherein when performing the screen locking operation,
   a first alerting device in the plurality of alerting devices coupled to the first client device outputs an alerting message.

4. The test data integration system according to claim 1, wherein
   responding to that at least one first test information, corresponding to the first client device in the plurality of client devices, in the plurality of test information meets a condition, the first client device or the server sends a warning message.

5. The test data integration system according to claim 4, wherein the first test information comprises a usage count of a probe or a retest rate of a fixture,
   wherein when the usage count of the probe is greater than a second threshold value or the retest rate of the fixture is greater than a third threshold value, the first client device or the server sends the warning message,
   wherein the first test information comprises a count of the screen locking operation performed in a time interval by the first client device, whether the automatic test equipment coupled to the first client device is faulty, or a temperature of the automatic test equipment coupled to the first client device,
   wherein when the count of the screen locking operation performed in the time interval by the first client device is greater than a fourth threshold value, the automatic test equipment coupled to the first client device is faulty, or the temperature of the automatic test equipment coupled to the first client device is greater than a fifth threshold value, the first client device or the server sends the warning message.

6. The test data integration system according to claim 1, wherein
   each of the plurality of client devices is coupled to a temperature sensor for sensing the temperature of the automatic test equipment.

7. The test data integration system according to claim 1, wherein
   the first client device in the plurality of client devices obtains first test information in the plurality of test information, generates a user interface according to the first test information to display a plurality of detailed test information of the automatic test equipment coupled to the first client device.

8. The test data integration system according to claim 7, wherein
   the plurality of detailed test information comprises at least one of a test item name, a state of a signal line, a test category, a test count, a number of test passes, a number of first pass yields, a number of retry passes, a number of bad test results, and problems occurring during a test.

9. The test data integration system according to claim 1, wherein
   the integration analysis result comprises at least one of detailed test information of each client device, a count of a screen locking operation performed by each client device, and a connection state between the server and each client device or between the server and the automatic test equipment coupled to each client device,
   wherein the integration analysis result comprises at least one of real-time test data of the plurality of client devices, historical test data of the plurality of client devices, a screen locking record of the plurality of client devices, a probe operation situation of the automatic test equipment coupled to each of the client devices, the connection state of the plurality of client devices, and a real-time temperature of the automatic test equipment coupled to each client device.

10. A test data integration method for a test data integration system, the system comprising a plurality of client devices and a server, each of the plurality of client devices being coupled to automatic test equipment, the server being coupled to the plurality of client devices, the method comprising:
- collecting, by each of the plurality of client devices, a plurality of test information obtained from the coupled automatic test equipment when performing a test operation, and transmitting the plurality of test information to the server;
- receiving, by the server, the plurality of test information, and generating a graphical user interface according to the plurality of test information and displaying an integration analysis result corresponding to the plurality of test information;
- responding to that at least one test information corresponding to a first client device in the plurality of client devices has a same-type test failure record and a count of successive occurrences of the same-type test failure record is greater than a first threshold value, stopping, by the first client device, the operation of the automatic test equipment coupled to the first client device, and performing a screen locking operation to lock a screen of the first client device;
- after performing the screen locking operation to lock the screen of the first client device, receiving, by the first client device, an account and a password, and unlocking the screen of the first client device according to the account and the password; and
- storing, by the first client device, a time point of performing the screen locking operation, a duration of the screen locking operation and personnel information corresponding to the account.

11. The test data integration method according to claim 10, wherein storing, by the first client device, the time point of performing the screen locking operation, the duration of the screen locking operation and the personnel information corresponding to the account comprises:
- storing, by the first client device, the time point of performing the screen locking operation, the duration of the screen locking operation and the personnel information corresponding to the account into a database.

12. The test data integration method according to claim 10, wherein the test data integration system further comprises a plurality of alerting devices, the plurality of alerting devices being coupled to the plurality of client devices respectively, wherein the step of performing the screen locking operation comprises:
- outputting, by a first alerting device in the plurality of alerting devices coupled to the first client device, an alerting message.

13. The test data integration method according to claim 10, further comprising:
- responding to that at least one first test information, corresponding to the first client device in the plurality of client devices, in the plurality of test information meets a condition, sending, by the first client device or the server, a warning message.

14. The test data integration method according to claim 13, wherein the first test information comprises a usage count of a probe or a retest rate of a fixture, and the method further comprises:

when the usage count of the probe is greater than a second threshold value or the retest rate of the fixture is greater than a third threshold value, sending, by the first client device or the server, the warning message, wherein the first test information comprises a count of the screen locking operation performed in a time interval by the first client device, whether the automatic test equipment coupled to the first client device is faulty, or a temperature of the automatic test equipment coupled to the first client device, the method further comprises:

when the count of the screen locking operation performed in the time interval by the first client device is greater than a fourth threshold value, the automatic test equipment coupled to the first client device is faulty, or the temperature of the automatic test equipment coupled to the first client device is greater than a fifth threshold value, sending, by the first client device or the server, the warning message.

15. The test data integration method according to claim 10, wherein
- each of the plurality of client devices senses the temperature of the automatic test equipment through a coupled temperature sensor.

16. The test data integration method according to claim 10, further comprising:
- obtaining, by the first client device in the plurality of client devices, first test information in the plurality of test information, generating a user interface according to the first test information to display a plurality of detailed test information of the automatic test equipment coupled to the first client device.

17. The test data integration method according to claim 16, wherein
- the plurality of detailed test information comprises at least one of a test item name, a state of a signal line, a test category, a test count, a number of test passes, a number of first pass yields, a number of retry passes, a number of bad test results, and problems occurring during a test.

18. The test data integration method according to claim 10, wherein
- the integration analysis result comprises at least one of detailed test information of each client device, a count of a screen locking operation performed by each client device, and a connection state between the server and each client device or between the server and the automatic test equipment coupled to each client device,
- wherein the integration analysis result comprises at least one of real-time test data of the plurality of client devices, historical test data of the plurality of client devices, a screen locking record of the plurality of client devices, a probe operation situation of the automatic test equipment coupled to each of the client devices, the connection state of the plurality of client devices, and a real-time temperature of the automatic test equipment coupled to each client device.

\* \* \* \* \*